No. 680,988. Patented Aug. 20, 1901.
S. B. STORER.
MAGNETIC SPEED INDICATOR.
(Application filed Mar. 14, 1900.)
(No Model.) 2 Sheets—Sheet 1.
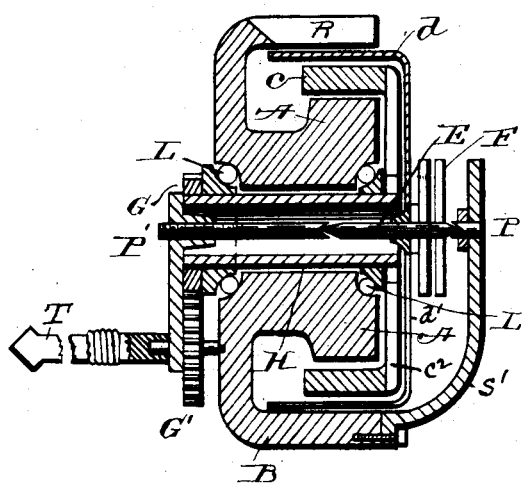
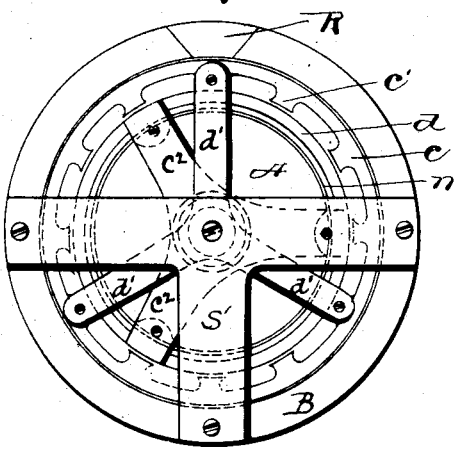
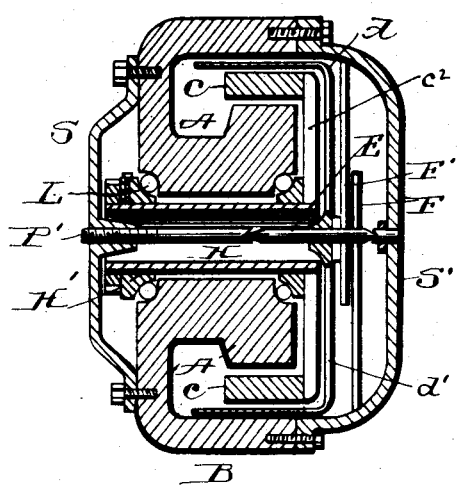
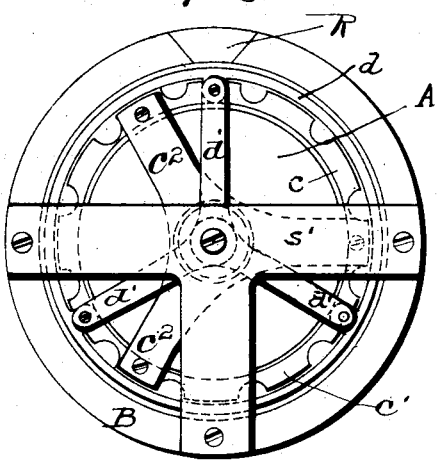
Witnesses.
J. M. Fawler Jr.
F. T. Chapman
Inventor
Simon B. Storer
By Lyons & Bissing,
Attys.

No. 680,988. Patented Aug. 20, 1901.
S. B. STORER.
MAGNETIC SPEED INDICATOR.
(Application filed Mar. 14, 1900.)
(No Model.) 2 Sheets—Sheet 2.
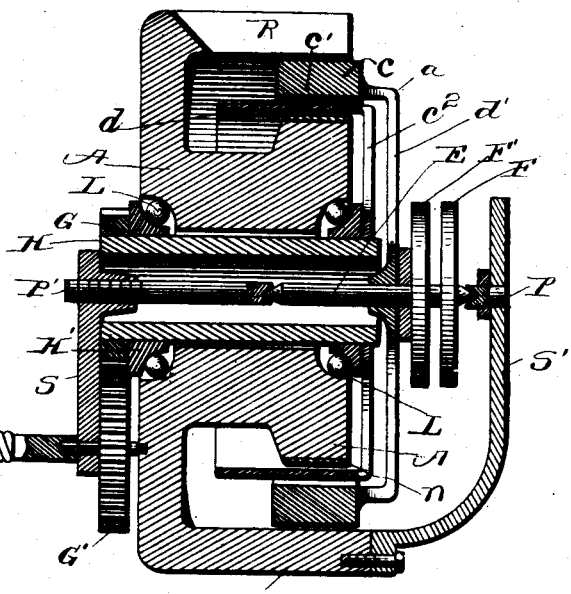
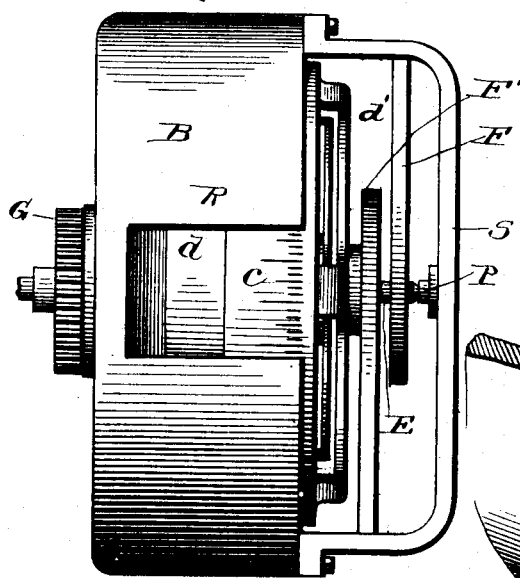
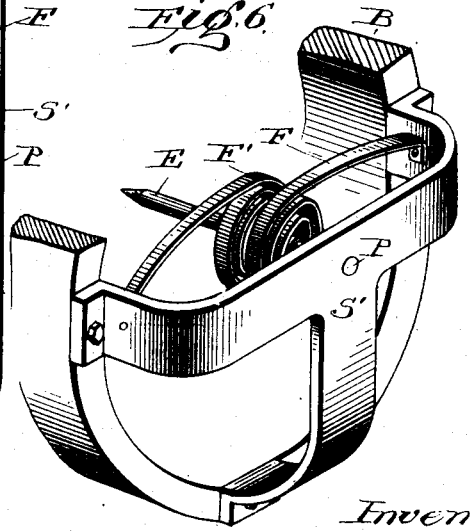
Witnesses
J. M. Fowler Jr.
F. T. Chapman
Inventor
Simon B Storer
By Lyons & Bissing
Attys

UNITED STATES PATENT OFFICE.

SIMON B. STORER, OF SYRACUSE, NEW YORK.

MAGNETIC SPEED-INDICATOR.

SPECIFICATION forming part of Letters Patent No. 680,988, dated August 20, 1901.

Application filed March 14, 1900. Serial No. 8,648. (No model.)

*To all whom it may concern:*

Be it known that I, SIMON B. STORER, a citizen of the United States, and a resident of Syracuse, in the county of Onondaga and State of New York, have invented certain new and useful Improvements in Magnetic Speed-Indicators, of which the following is a specification.

The object of my invention is to produce a magnetic speed or velocity indicator which shall be of a size and weight to make it readily portable and yet be powerful and accurate and at the same time give uniform results under varying conditions of use.

Magnetic speed-indicators have been previously devised. They depend upon the pull which moving permanent magnets exert on a copper disk biased to a normal position of rest, the movement of the magnets causing a displacement of the disk from its normal position of bias by an amount proportional to the speed of the magnets' movement. The construction of such indicators has required that the permanent or energizing magnets be movable—that is, either revoluble or oscillatory. Again, such permanent magnets were inefficient and not suitable for giving the most powerful results because of the shape it was necessary to give to them. By reason of the movability of the permanent magnet and its inefficiency it has heretofore been found necessary to make magnetic speed-indicators very large in order to produce an appreciable effect, which means that indicators embodying such movable permanent magnets have either been very heavy and cumbersome or inefficient.

In a speed-indicator constructed in accordance with my invention the permanent or energizing magnet is no longer movable, but becomes a stationary field-magnet. Besides, it is given a form, preferably, with concentric annular poles, which is adapted to give the most powerful effects. Within the field of this permanent or field magnet I mount a soft iron or steel keeper or armature, which is movable and which in case the field-magnet has annular concentric poles I make in the form of a cylinder moving in the space between the poles. This armature I furthermore make of toothed or other irregular shape, so as to cause a bunching or tufting of the lines of force in the magnetic field within which the armature moves. In juxtaposition to the armature I mount a movable part, preferably of low and constant electrical resistance or made of copper, German silver, or the like. Thus I use a copper or other low-resistance cylinder concentric with the cylindrical armature when I employ a field-magnet of the type above referred to, in which the poles are concentric and annular. I may now either make the soft iron or steel armature revoluble and the low-resistance part oscillatory or I may have the armature oscillate and the low-resistance part revolve. In either case the oscillatory part is biased to a normal position of rest by a spring or springs. Assuming that the soft iron or steel armature is revoluble and that it is revolved through suitable gearing by the part the speed of which it is desired to measure, I have found that the revolution of the armature by reason of the lines of force which it drags along with it will exert a pull upon the oscillatory low-resistance part which is in proportion to the speed of rotation. This oscillatory part being biased to remain in a normal position by a spring the reaction of which under different displacements is reasonably constant, it becomes plain that the oscillatory part will be displaced from its normal position by an amount which is proportional to the speed of the moving part, and assuming the existence of a proper scale the speed of the moving part may be at once read from the instrument. It is preferable to have the soft iron or steel armature oscillate and the low-resistance part revolve. This will do away with the eddy-current loss in the faces of the permanent magnet, which might become a source of error in case the soft-iron armature were revolved at high speed. Besides, I am enabled in this form to use a copper or other low-resistance shield placed in a fixed position close to the soft-iron armature, so as to act as a damper against any sudden acceleration of the oscillating armature. The instrument thus becomes dead-beat.

In the drawings, Figure 1 is a central section of one form of indicator; Fig. 2, a central section taken at right angles thereto. Fig. 3 is a plan of the same form of indicator. Fig. 4 is a plan of another form of indicator. Fig. 5 is a cross-section of the modified form shown in Fig. 4. Fig. 6 is a perspective of the pair of spiral springs, and Fig. 7 is a detail of the indicator.

The energizing or field magnet, which has been shown as a permanent magnet, but which might also be an electromagnet, has a central pole A and a surrounding concentric cylindrical pole B, with a field of force in the space between the poles. This form of field-magnet is most efficient, being at once powerful and compact. It is, however, not the only form which I may employ.

The soft-iron armature $c$ has been shown of cylindrical form, accommodating itself to the space between the field-poles A and B. Naturally if the shape of the field-poles is varied the shape of the armature $c$ will be varied correspondingly. The armature is formed with teeth $c'$ or other irregularities of shape or structure in order to tuft or bunch the lines of force of the field, and it is mounted on an armed spider $c^2$, and thereby secured in a fixed fashion to the hollow shaft H. To the shaft H are secured cones H', which rest against ball-bearings L. A gear-wheel G is fastened to the shaft H, and a second gear-wheel G' meshes therewith in order to drive it. A key T or other suitable device, such as a pulley or wheel, being connected with the gear G', it is manifest that if the key T is pressed against a rotary part whose speed is to be measured, such as a shaft, the rotation of the shaft will be communicated through the parts T G' G H to the armature $c$, causing it to rotate with an angular velocity proportional to that of the shaft or part whose speed is to be measured. The key T, as shown, has a spear-head the point of which is pressed against the axial center at the end of the rotating shaft whose speed is to be measured. Generally, the projecting ends of shafts of machines have countersinks, made in turning up the shaft, into which this spear-head will fit. The low-resistance part $d$ is shown as a cylinder concentric with and corresponding in shape to the armature $c$ and field-poles. It is mounted by arms $d'$ on a spindle E. The spindle rests in steps P, one of which is secured in a bracket S' and the other of which is formed in a post P', that is threaded into the bracket S, which bracket also serves as a support for the spindle of the gear G'. Two spiral springs F F', oppositely wound, have one of their ends each secured to the spindle E and their other ends secured to some fixed part of the device, such as the bracket S'. These springs give the oscillatory part $d$ a bias to return to a fixed normal position. Should the indicator be so used that the part $d$ always tends to move in a given direction, one of the springs F F' may be omitted. For convenience of illustration these springs have not been shown in the plan views. There is a slot R cut into the outer pole of the field-magnet, so as to permit the extent of the displacement of the oscillatory part $d$ to be observed.

The operation of the speed-indicator (shown in Figs. 1 and 3) will now be clear. The part T or the like being pressed against the moving part whose speed is to be measured, it is clear from what has been above said that the armature $c$ rotates at a speed proportional to that of the moving part. This rotation of the armature $c$ causes a magnetic pull or drag on the oscillatory low-resistance part $d$, the amount of which pull is proportional to the speed of rotation of the armature $c$. The oscillatory part $d$ will therefore be displaced from its normal position until the reaction of the spring F, tending to return it to the normal position, is precisely balanced; but as the force exerted by the spring is about proportional to the displacement of the part $d$ and as the pull of the armature on the part $d$ is about proportional to its speed it follows that the displacement of the oscillatory part $d$ from its normal position of rest is proportional to the speed of the moving part. By having the outer face of the part $d$ properly graduated this speed can at once be read through the aperture R. If so desired, the outer face may be graduated in miles per hour to adapt it for use on railway-trains or other moving vehicles.

In the construction of Fig. 4 the armature $c$ is mounted on a part corresponding to the spindle E—that is to say, the armature $c$ is mounted to oscillate. On the other hand, the low-resistance part $d$ is mounted on a part corresponding to the shaft H—that is, it is mounted to revolve. In this case the rotary low-resistance part will drag along the oscillatory soft iron or steel armature, which has a normal position of rest. By reading the amount of displacement of the oscillatory armature through the slot R the speed is determined. I may call attention to the copper or other shield $n$ which is used in this construction and which closely embraces the inner pole A of the field-magnet and which acts to prevent any sudden acceleration of the armature $c$.

The compactness and magnetic strength of my indicator cannot be overlooked. I have provided a pair of field-poles which act upon each portion or element of my armature and low-resistance part. The advantage of such construction over those using a number of small movable horseshoe-magnets, where each magnet merely acts upon a portion of the moving parts, is apparent.

I have not thought it necessary to show the surrounding case for this indicator, nor have I shown the graduation on the moving part, from which the speed may be directly read. So, too, although I have shown one form of indicator in which the armature oscillates and another form in which the armature revolves I have shown in each case the armature as a cylinder; but it will be understood while this is the preferred form that it is not the only form or shape which my armature and the parts coöperating therewith may assume. Again, I have shown the armature with teeth for bunching the lines of force; but manifestly any irregularity in shape or structure might be used instead of these teeth.

What I claim is—

1. A magnetic speed-indicator comprising a field-magnet, a movable armature and a movable low-resistance part both mounted to be cut by the same lines of force of the common field, one of the movable elements being revoluble and acting to drag along the other element which is oscillatory, and a mechanical biasing device for the oscillatory element, substantially as described.

2. A magnetic speed-indicator comprising a field-magnet having concentric poles, a movable armature and movable low-resistance part within its field, one of the movable elements being revoluble, and the other being oscillatory but biased to a normal position of rest, substantially as described.

3. A magnetic speed-indicator comprising a field-magnet having concentric annular poles and a movable cylindrical armature and a movable cylindrical low-resistance part both within its field, one of the movable elements being revoluble and the other being oscillatory but biased to a normal position of rest, substantially as described.

4. A magnetic speed-indicator comprising a field-magnet having concentric annular poles and a movable cylindrical toothed armature and a movable cylindrical low-resistance part both within its field, one of the movable elements being revoluble and the other being oscillatory but biased to a normal position of rest, substantially as described.

5. A magnetic speed-indicator comprising a field-magnet having concentric poles, a movable armature and movable low-resistance part within its field, a hollow rotary shaft for supporting one of the movable elements and an oscillatory spindle within the hollow shaft biased to a normal position of rest and supporting the other movable elements, substantially as described.

6. A magnetic speed-indicator comprising a field-magnet having concentric poles, a movable armature and movable low-resistance part within its field, a hollow rotary shaft for supporting one of the movable elements, ball-bearings for supporting the shaft, an oscillatory spindle within the hollow shaft supporting the other movable elements, and a spring or springs for giving the spindle a bias to a normal position of rest, substantially as described.

7. A magnetic speed-indicator comprising a field-magnet having concentric poles, and an oscillatory armature biased to a normal position of rest, and a revoluble low-resistance part both moving within its field, substantially as described.

8. A magnetic speed-indicator comprising a field-magnet having concentric annular poles and an oscillatory cylindrical armature biased to a normal position of rest and a revoluble low-resistance cylindrical part both moving within its field, substantially as described.

9. A magnetic speed-indicator comprising a field-magnet, having an oscillatory armature mechanically biased to a normal position of rest and a revoluble low-resistance part which acts to drag along the oscillatory armature, both parts mounted to move in the common field of the magnet, substantially as described.

10. A magnetic speed-indicator comprising a field-magnet having an oscillatory armature mechanically biased to a normal position of rest and a revoluble low-resistance part to drag along the armature, both moving within its common field and a stationary electrical shield in juxtaposition to the armature, substantially as described.

11. A magnetic speed-indicator comprising a field-magnet, a movable armature and a movable low-resistance part, one of the movable elements being revoluble and acting inductively upon the other element which is oscillatory but mechanically biased to a normal position of rest to drag it along, substantially as described.

12. A magnetic speed-indicator comprising a field-magnet, having an oscillatory armature mechanically biased to a normal position of rest and a revoluble low-resistance part acting inductively upon the armature to drag it along, substantially as described.

In testimony whereof I have signed my name to this specification in the presence of two subscribing witnesses.

SIMON B. STORER.

Witnesses:
  LOUIS W. EMERICK,
  GEORGE W. PULVER.